United States Patent [19]

von Allwörden

[11] 4,071,105
[45] Jan. 31, 1978

[54] COUPLING DEVICE FOR A POWER TRANSMISSION SHAFT

[75] Inventor: Wilhelm von Allwörden, Lohmar, Germany

[73] Assignee: Jean Walterscheid GmbH, Lohmar, Germany

[21] Appl. No.: 716,835

[22] Filed: Aug. 23, 1976

[30] Foreign Application Priority Data

Aug. 23, 1975 Germany .............................. 2537601

[51] Int. Cl.² .............................................. B60D 1/08
[52] U.S. Cl. .................................. 180/14 R; 180/53 C
[58] Field of Search ................ 180/14 B, 14 R, 53 R, 180/53 D, 53 C; 280/477, 478 A, 478 B, 479 R, 479 A

[56] References Cited

U.S. PATENT DOCUMENTS

| 2,869,660 | 1/1959 | Miller | 180/14 R |
| 3,299,979 | 1/1967 | Restall | 180/14 R |
| 3,385,388 | 5/1968 | Restall | 180/14 R |
| 3,847,415 | 11/1974 | Geisthoff | 180/14 R X |
| 3,871,463 | 3/1975 | Geisthoff | 180/14 B |

FOREIGN PATENT DOCUMENTS 1,198,212  8/1965  Germany .......................... 180/14 R Primary Examiner—Joseph F. Peters, Jr.
Assistant Examiner—John A. Pekar
Attorney, Agent, or Firm—Edmund M. Jaskiewicz

[57] ABSTRACT

A coupling device for making a driving connection between a power take-off shaft and a transmission shaft has a coupling hub mounted upon the power take-off shaft and a coupling drum which co-axially surrounds the coupling hub may be journalled upon the hub or attached to the tractor. A coupling sleeve on a power transmission shaft is detachably connected to the coupling hub by a quick release fastener means. The outer surface of the coupling drum has a pivot support upon which an actuating member is pivotally supported. The actuating member has one arm connected to the coupling sleeve and the other arm defines an operating lever such that pivoting of the operating lever will effect a relative axial movement of the coupling sleeve and the coupling hub.

9 Claims, 4 Drawing Figures

COUPLING DEVICE FOR A POWER TRANSMISSION SHAFT

The present invention relates to a quick coupling device for making a driving connection between two shafts, more particularly, to the structure for engaging and disengaging such a coupling device between the power take-off shaft of a tractor and a transmission shaft of an agricultural machine.

Various forms of quick coupling devices have been provided for making a driving connection between the power take-off shaft of a tractor and the power transmission shaft of an agricultural machine or implement. Such a coupling device generally comprises inter-engaging coupling members one of which is a coupling hub having external splines engageable with the internal splines of a coupling sleeve and the coupling members are held together by a quick-release snap fastener.

A known form of such a coupling device comprises an externally splined conical end member non-rotatably secured to the end of a power take-off shaft of a tractor and which in the operatively engaged position transmits torque to a cardan shaft provided with a mating member having an internally splined conical suface. The mutually engaged coupling elements are retained against axial displacement by two spring loaded lever arms which are pivotable about a fulcrum and which have an annular portion engaging in an annular groove formed in the externally splined end piece on the take-off shaft. The other lever arm extends through a slot in the wall of the internally splined coupling member to protrude therefrom. The outwardly protruding lever arms are surrounded by an internally tapered axially slidable sleeve member which is positioned co-axially around the internally splined coupling member. Because of the taper of the sliding sleeve, the outer lever arms of the snap levers will execute a radially inwardly directed pivotal movement such that the inner arms of the snap levers are disengaged from the annular groove to release the coupling. The sliding sleeve, which is secured to the tractor, is operated by a bifurcated operating lever.

The above described coupling device has the disadvantage that the teeth of the inter-engaging conical members tend to become axially displaced as the torque loads increase. This displacement together with the relatively large manufacturing tolerances of the splined conical elements which are generally forgings apply continuously repeated forces to the snap lever arms in the annular groove. In addition, at high rotary speeds the snap fastener is subjected to considerable centrifugal forces which tend to dislodge the snap lever arms from their operative engagement in the annular groove which in turn causes an opening or disengagement of the coupling device. Such a coupling device was thus unsatisfactory in that it did not provide the required standard of safety and reliability in operation.

A further disadvantage of the above described coupling device is that considerable effort is required to engage the coupling device because the snap levers must first be forced over the conical guides in opposition to spring forces before the levers can snap into the annular groove.

Still another disadvantage of such a known coupling device is the inconvenience and difficulty of coupling the shafts. In order to couple the shafts the operator must position his hands into a not readily accessible space between the protective boot of the power take-off shaft on the tractor and the corresponding member on the cardan shaft in order to manipulate the sliding bolts or other fasteners to achieve an axial securing of the cardan or power transmission shaft.

It is therefore the principal object of the present invention to provide an improved coupling device for coupling the power take-off shaft of a tractor to the transmission shaft of an agricultural implement or machine.

It is another object of the present invention to provide such a coupling device which is safe and reliable in operation and simple in construction.

It is a further object of the present invention to provide such a coupling device which can be readily actuated from the tractor seat or from the ground without the necessity of the operator of squeezing into the space between the tractor and the agricultural machine.

According to one aspect of the present invention a coupling device for making a driving connection between a power take-off shaft and a transmission shaft may comprise a coupling hub mounted upon the power take-off shaft and a coupling drum surrounding the coupling hub. A coupling sleeve on the power transmission shaft is detachably connected by a quick release fastener means to the coupling hub such that the coupling sleeve is disposed axially between the coupling hub and coupling drum when connected.

The outer surface of the coupling drum is provided with a pivot support upon which an actuating member is pivotally mounted. The actuating member has one arm connected to the coupling sleeve and a second arm defining an operative lever. Pivoting of the operating lever will effect relative axial movement of the coupling sleeve and coupling hub to facilitate engagement or disengagement of the coupling device.

The coupling hub is secured upon the power take-off shaft by a ball catch fastening device and the coupling sleeve is secured to the coupling hub by a second ball catch fastening device.

The present invention also provides that the coupling drum is non-rotatably mounted on the tractor and is journalled upon the coupling hub. The coupling hub is thus locked to the power take-off shaft against axial displacement. As a result of this structure, the operations of locking and releasing the coupling can be readily carried out with a minimum of effort either from the driver's seat or from the ground.

The coupling drum also functions as an accident guard and together with the boot upon the power transmission shaft completely encloses the coupling after the coupling is engaged.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
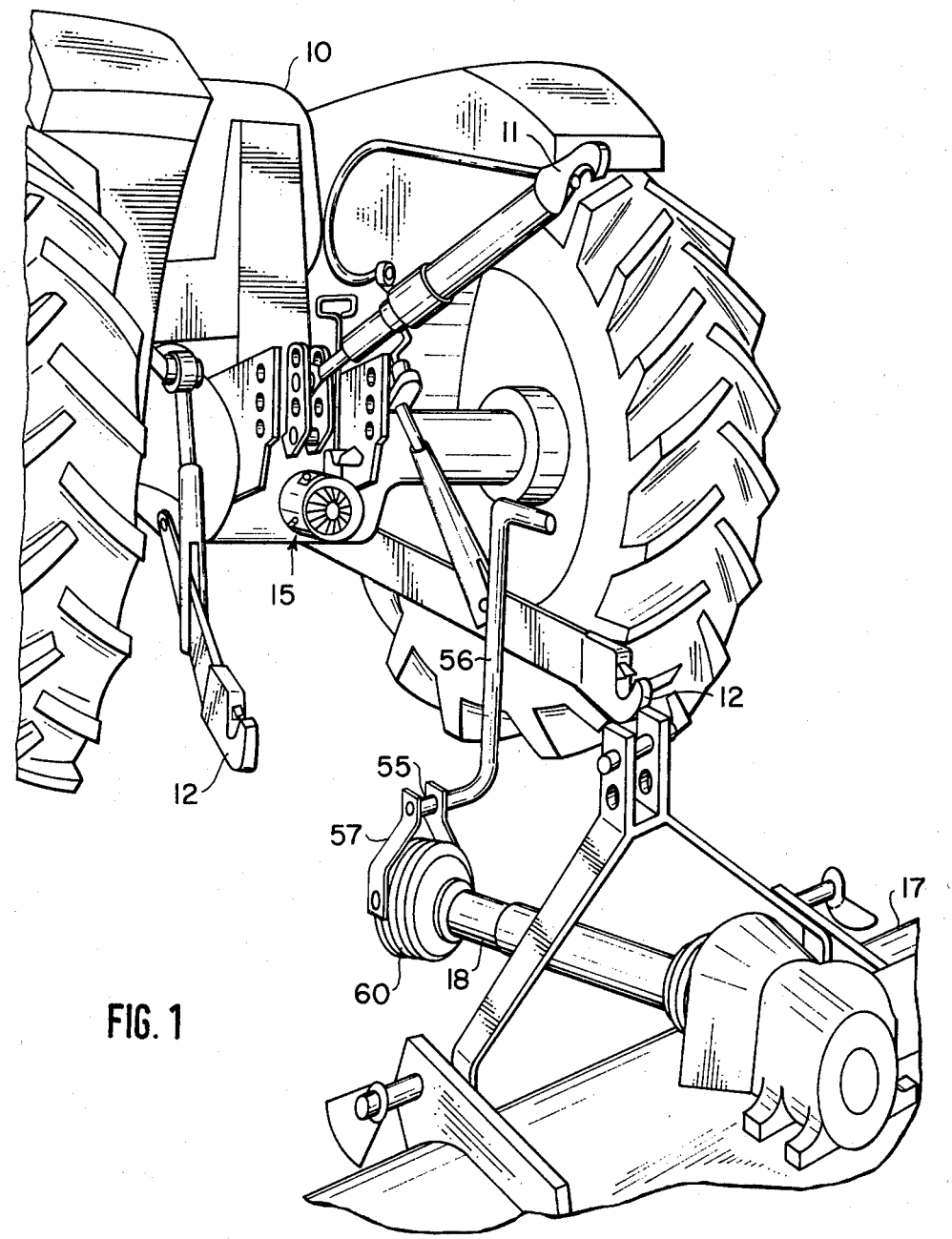
FIG. 1 is a perspective view of the rear of a tractor having the coupling device of the present invention together with a portion of an agricultural machine having a transmission shaft which is to be coupled to the tractor.

In FIG. 1 there is illustrated the rear of a tractor 10 provided with a three-point hitch comprising an upper coupler 11 and lower couplers 12. Extending from the rear portion of the tractor is a power take-off shaft 13 having longitudinal splines 14 thereon enclosed by a coupling device of the present invention indicated generally at 15. A power transmission shaft 16 which is of the cardan type extends from an agricultural machine or implement 17 which is to be connected to the tractor.

Figure 2:
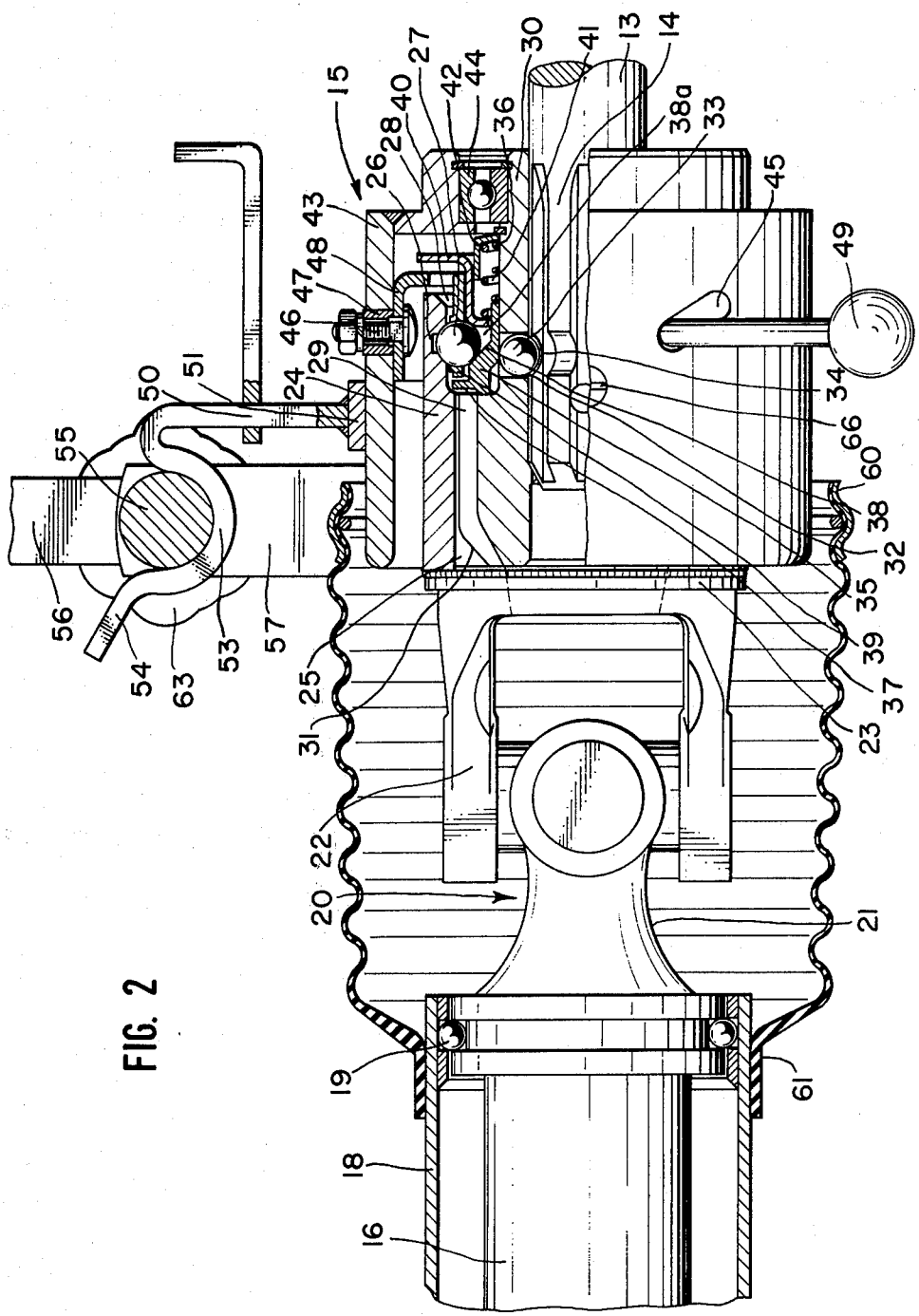
FIG. 2 is a longitudinal sectional view of the coupling device of the present invention.

As may be best seen in FIG. 2, the transmission shaft 16 is enclosed by a protective tubular member 18 which is journalled at 19 on the cardan shaft. At the end of the cardan shaft is a universal joint indicated generally at 20 comprising a yoke arm 21 which is secured to the end of the cardan shaft 16 in a known manner and a yoke arm 22 having a flange 23 thereon to which is connected a coupling sleeve 24 having longitudinal internal splines 25. The inner surface of the coupling sleeve 24 is provided with an annular groove 26 in which are seated balls 27 of a ball fastener. The inner edge of the open end of the sleeve 24 is chamfered at 28 in the direction from the inner to the outer periphery.

The internal splines 25 of the coupling sleeve 24 are engaged by external splines 29 on a coupling hub 30 which is in turn provided with internal splines so as to be lockingly engageable with the splines 14 on the end of the power take-off shaft 13. The splines 29 are rounded at their outer ends 31 to facilitate meshing engagement between the components.

Behind the ends of the splines 29 on the hub 30 there is a number of circumferentially spaced bores 32 in which are positioned the fastener or locking balls 33 which are engageable with an annular groove 34 formed in the power take-off shaft 13. The balls 33 are retained in an operative locking position by a securing sleeve 35 which is urged axially to the left by a spring 36. The outer surface of the sleeve 35 facing toward the coupling sleeve splines 29 is enlarged to form a flange having a release space 37. The outer sleeve surface is also provided with an inclined bearing face 38 which forms a bearing surface for the balls 27 and defines a ball trap or pocket 38a. The locking balls 27 are guided on their other sides by a control or retaining ring 39 having a plurality of openings therein to retain the balls 27 so that in the locked position the balls 27 are engaged in the annular groove 26. The control ring 38 is mounted upon a securing ring 40 which is axially slidable upon the hub 30 and is urged axially toward the left into the locking position by a spring 41. The other ends of the springs 36 and 41 bear against a collar 42 secured against axial displacement toward the right by a split ring or the like.

The coupling hub 30 is rotatably connected with a coupling drum 43 by a roller bearing 44 so that the drum 43 is journalled upon the hub 30. The coupling drum 43 co-axially surrounds the coupling hub 30 and the coupling sleeve 24. The peripheral wall of the drum 43 is provided with a plurality of equidistantly spaced apart obliquely extending slots 45 through which extend actuating pins 46 mounted in bushings 47. The pins 46 are rigidly connected with an actuating ring 48. The actuating ring 48 is engageable with the securing ring 40 when moved axially toward the right as viewed in FIG. 2.

Figure 3:
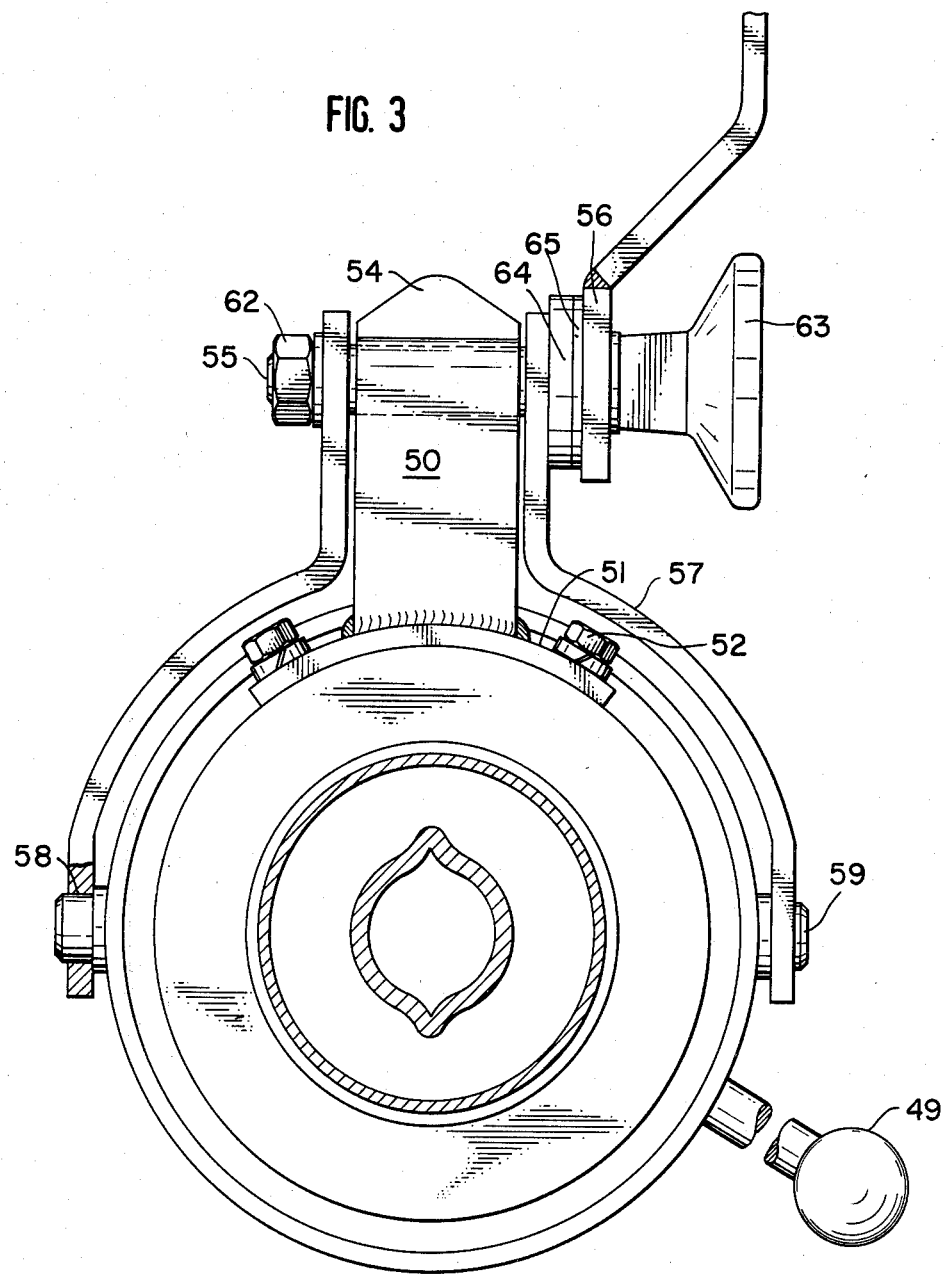
FIG. 3 is a front elevational view of the coupling device.

A pivot bearing support 50 is mounted on a supporting bracket 51 attached to the outer surface of the coupling drum by screws 52 as shown in FIG. 3. The support 50 is bent to form a curved portion 53 which functions as a pivot bearing and the end of the support is inclined upwardly to terminate at 54. Journalled in the bearing 53 is a shaft 55 to which is secured an operating lever 56 and an operating fork 57 the ends of which are provided with bores 58 to receive pins 59. The pins 59 are attached to a corrugated, flexible protective boot 60 the other end of which 61 is attached in a known manner to the outer surface of the cardan shaft protective tube 18.

The pivot shaft 55 is provided with a nut 62 and the other end is provided with a set screw 63 having a large diameter portion to function as a handle. A pair of mating radially grooved gears 64 and 65 are interposed between the fork 52 and the operation lever 56 such that pivoting of the lever 56 will in turn pivot the fork 57 and axially move the protective boot 60 with respect to the coupling sleeve 24 and in a direction parallel to the axis of the transmission shaft 16.

The coupling device 15 comprising the coupling drum 43 and the coupling hub 30 have been described as being a separate component not attached to the tractor but which must be assembled upon the power take-off shaft 13. In order to position the coupling device upon the power take-off shaft, the securing sleeve 35 is forced back against spring 36 with the aid of two screw-drivers inserted through lateral bores 66 in the coupling drum 43 so as to engage the sleeve 35. When the sleeve 35 is urged to the right as viewed in FIG. 2, the balls 30 will be free to move radially outwardly to enable the coupling hub 30 to be slid upon the power take-off shaft 13. When the hub 30 is in its axial position upon the power take-off shaft the balls 33 will drop into the annular groove 34 of the power take-off shaft. The screw-drivers are then withdrawn from the openings 66 and the sleeve 35 under the force of spring 36 will slide to the left to secure the balls 33 in the groove 34. At this point, the coupling hub 30 together with the coupling drum 43 which is journalled thereon is axially locked on the tractor power take-off shaft 13.

The tractor 10 is now driven in the reverse direction toward the implement 17 which is to be connected to the tractor. The tractor operator from his seat on the tractor grips the operating lever to lift the power transmission shaft 16 and its protective tube 18 by means of the fork lever 57 and the protective boot 60 to such a height that the transmission shaft 16 is approximately at the same level as the coupling drum 43. At the same time while the tractor operator is gripping the operating lever 56 the pivot shaft 55 is moved into the bearing 53 mounted on the support 50 which extends upwardly from the coupling drum 43. The tractor operator then pivots the operating lever 56 in a direction toward the rear or away from the tractor such that the operating lever pivots about its pivot axis 55. This pivoting of the operating lever transmitted through the fork 57 will cause the protective boot 60 and thereby, coupling sleeve 24 to move axially toward the coupling hub 30 through the bearings 19, shaft 16, universal joint 20 and flange 23. The coupling sleeve 24 will thus slide over the coupling hub 30 to bring about a meshing engagement of their respective axial splines with this meshing being facilitated by the rounded ends 31 of the coupling hub teeth 29. The chamfered edge 28 of the coupling sleeve 24 will engage the locking balls 27 positioned within the retaining ring 39 and moves the balls rearwardly toward the tractor. This securing ring 40 is displaced against the force of its loading spring 41 to permit the balls 27 to drop into the ball trap 38. The spring 41 will now relax thereby pushing the securing ring 40 with the balls 27 therein in the direction of the now attached machine. In the course of this movement the locking balls 27 will slide upwardly from the ball trap 38a along the inclined bearing surface 38 of the sleeve 35 to engage with the ball grooves 26 of the coupling sleeve 24 whereupon the coupling device between the tractor and machine is now axially locked. The bearing 44 permits the hub 30 to rotate with respect to the coupling drum 43. The drum 43 is fixed against rotation with respect to the tractor by the engagement of the bearing support 50 in the fork member 53. The coupling device is now in operative connection and is ready for service by the transmission of power from the tractor to the attached machine.

In order to release or disengage the coupling device, the lever 49 is pivoted laterally. This lateral pivoting causes the pins 46 to slide within the inclined slots 45 in the direction toward the tractor and the control ring 48 will move axially toward the tractor to engage the extending flange of the securing ring 40 to move the locking balls 27 against the force of the locking spring 41 such that the balls are moved out of their operative locking positions into the ball trap 38a. The coupling sleeve 24 is pulled out of engagement with the coupling hub 30 by pivoting the operating lever 56 in the direction toward the tractor. This pivoting movement which is transmitted through the bifurcated member 57 will cause the protective boot 60, the protective tubing 18, the cardan shaft 16 and the coupling sleeve 24 to be moved axially away from the tractor. In the course of this same movement the pivot bearing 55 is lifted and disengaged from the bearing support 53 by the operating lever 56. The coupling device is now disengaged.

Figure 4:
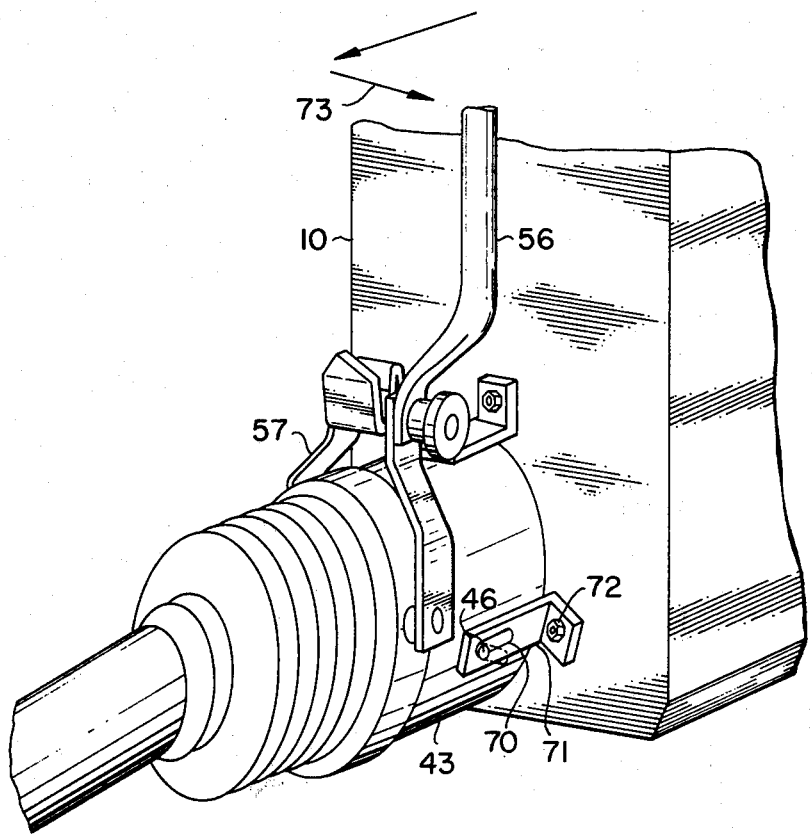
FIG. 4 is a perspective view of the coupling device wherein the coupling drum is attached to the tractor by supporting brackets.

In a modification of the above described coupling device, the coupling drum 43 can be attached to the tractor 10 as shown in FIG. 4. In this modification, the pins 46 are received in longitudinally extending slots 70 formed in brackets 71 which are attached to the tractor at 72. Thus, when it is desired to disengage the coupling device, the operating lever 56 is pivoted laterally in the direction of the arrow 73 to bring about the movement of the pins 43 in their oblique slots 45 which brings about the disengagement of the ball fastener device.

When the coupling drum is non-rotatably secured to the tractor and connected to the drive output shaft by means of the bearings 44, the longitudinal axes of the coupling drum, cardan shaft 16 and the drive output shaft 13 will extend along a single line. With this structure the outer splines of the coupling hub will always be covered by the coupling drum and thus protected against dirt and damage.

The coupling drum 43 can also be mounted upon the tractor such as to eliminate the necessity for providing a bearing between the coupling drum and the coupling hub.

It will be noted that by providing the control ring 48 with actuating pins 46 the coupling device can be manipulated without the exertion of any particular effort on the part of the tractor operator. The control ring can be turned by a slight pivotal movement of the control lever 49 connected to one of its pins such that the coupling device is disengaged without the necessity of the operator having to lift the wieght of the coupling drum.

The drum remains connected to the tractor and only the coupling sleeve 24 together with the power transmission shaft 16 and the protective boot 60 are manually pushed over or pulled off of the coupling hub with the aid of the operating lever 56.

The coupling hub is attached to the power take-off shaft of the tractor by a ball fastener device and the spring loaded securing sleeve at the same functions as a bearing for the locking balls of the ball fasteners which establish the mutual locking engagement between the coupling hub and the coupling sleeve. As a result of this construction substantially less space is required in the interior of the drum to accommodate the functional combination of two ball fastener devices than would be required for two relatively independent and separate ball fasteners.

It will be understood that this invention is susceptible to modification in order to adapt it to different usages and conditions, and accordingly, it is desired to comprehend such modifications within this invention as may fall within the scope of appended claims.

What is claimed is:

1. A device for releasably coupling a power take-off shaft of a tractor to a transmission shaft of a trailer towed by said tractor, said device comprising a coupling hub, means drivingly mounting said hub on said power take-off shaft, a coupling drum co-axially surrounding and spaced from said hub, said drum being substantially fixed relative to said tractor, a pivot support mounted on an outer surface of said drum, a coupling sleeve drivingly mounted on said transmission shaft, a first arm having a first end, means for pivotally connecting said first end to said sleeve, an actuating member non-rotatably connected to the other end of said first arm, a second arm having a first end non-rotatably connected to said actuating member, the other end of said second arm extending from said member whereby when said actuating member is positioned on said pivot support, pivotal movement of said second arm about the axis of said support will move said sleeve to a position co-axially between said hub and said drum for driving engagement with said hub, and quick-release fastener means for detachably connecting said sleeve to said hub when in said engagement.

2. A coupling device as claimed in claim 1 wherein said first arm comprises a fork element.

3. A coupling device as claimed in claim 2 wherein said means for pivotally connecting comprises a protective boot rotatably mounted relative to said transmission shaft and enclosing said coupling sleeve, said fork element being connected to said boot.

4. A coupling device as claimed in claim 1 wherein said fastener means comprises a retaining ring slidably mounted upon said coupling hub, a plurality of balls in said retaining ring and lockingly engageable with said coupling sleeve, spring means for biasing said retaining ring and balls into a locking position, and an actuating ring on said coupling drum and axially displaceable to urge said retaining ring into an unlocking position against the force of said spring means.

5. A coupling device as claimed in claim 4 wherein said actuating ring has a plurality of radially extending pins projecting through slots in said coupling drum, said slots being oblique to the axis of said drum, and a control lever attached to said pins.

6. A coupling device as claimed in claim 4 wherein said actuating ring has a plurality of radially extending pins projecting through slots in said coupling drum, said slots being oblique to the axis of said drum, a bracket attached to the tractor and having a slot parallel to the axis of said coupling drum, a said pin being guided within said slot.

7. A coupling device as claimed in claim 1 and further comprising roller bearing means for journalling said coupling drum on one of said coupling hub and said tractor.

8. A coupling device as claimed in claim 1 wherein said coupling drum is attached to said tractor.

9. A coupling device as claimed in claim 1 and a second fastener means for detachably connecting said coupling hub on said power take-off shaft and comprising a plurality of second balls within a plurality of openings in said hub, and a second ring slidable on said hub having a first position in which said balls are retained in locking engagement with said shaft and a second position in which said balls are released from locking engagement, said second ring having means thereon for moving said first balls into locking engagement with said coupling sleeve.

* * * * *